E. F. KRELL.
VEHICLE WHEEL.
APPLICATION FILED MAY 1, 1911.
1,052,064.
Patented Feb. 4, 1913.
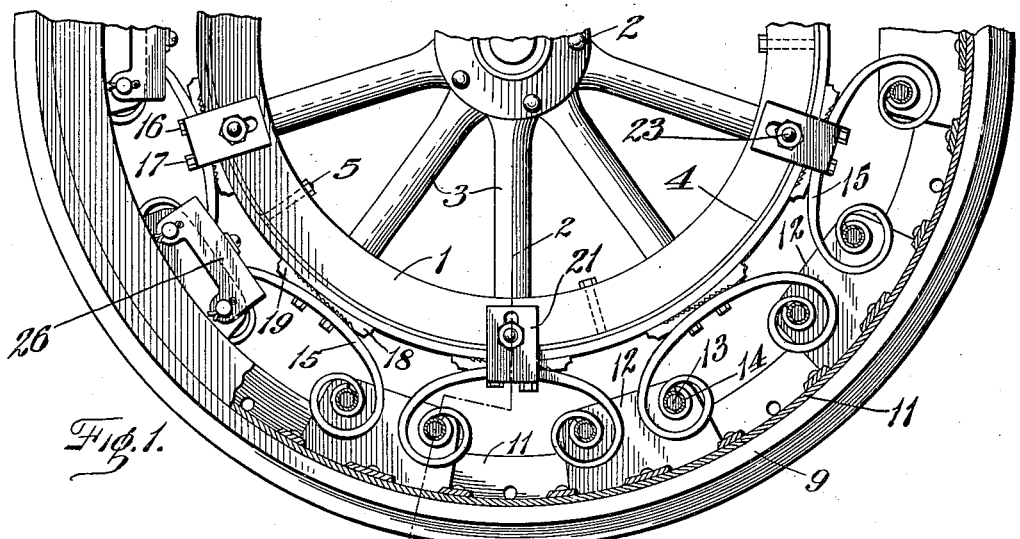
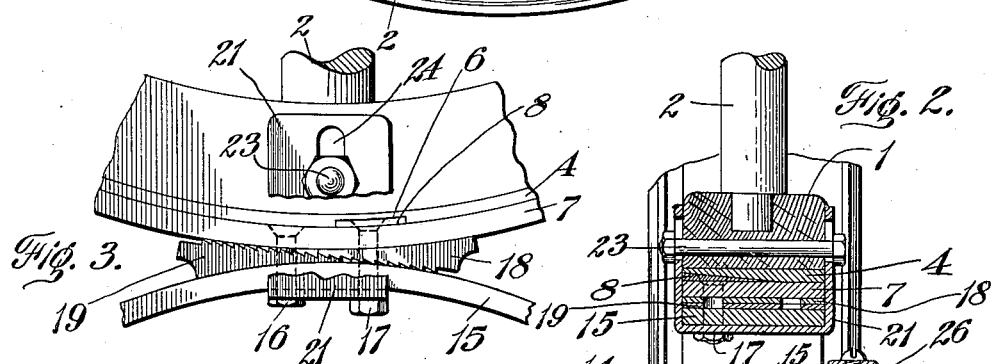
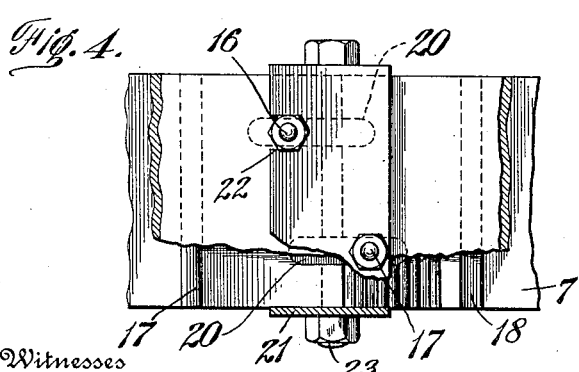
Witnesses
Chas. W. Stauffiger
A. M. Shannon
Inventor
EMIL F. KRELL.
By Barthol Barthol
Attorneys

UNITED STATES PATENT OFFICE.

EMIL F. KRELL, OF DETROIT, MICHIGAN.

VEHICLE-WHEEL.

1,052,064.

Specification of Letters Patent.

Patented Feb. 4, 1913.

Application filed May 1, 1911. Serial No. 624,333.

*To all whom it may concern:*

Be it known that I, EMIL F. KRELL, a citizen of the United States of America, residing at Detroit, in the county of Wayne and State of Michigan, have invented certain new and useful Improvements in Vehicle-Wheels, of which the following is a specification, reference being had therein to the accompanying drawings.

This invention relates to improvements in vehicle wheels and more particularly such wheels embodying a series of spring members forming a resilient outer portion and its object is to provide a construction in which the outer or rim portion of the wheel may be quickly detached and another one put in its place should any of the parts become broken and to provide certain other new and useful features in the construction, the invention consisting in the matters hereinafter set forth and more particularly pointed out in the claims reference being had to the accompanying drawing, in which—

Figure 1 is a side elevation of a portion of a wheel embodying the invention with parts broken away to show the construction; Fig. 2 is an enlarged transverse section on the line 2—2 of Fig. 1; Fig. 3 is an enlarged detail showing one of the spring attachments; and Fig. 4 is an inverted plan view of the same with portions broken away to show the construction.

As shown in the drawing 1 is an inner wooden rim carried by the hub 2 and spokes 3 of the wheel and secured to this rim is a steel band 4 which is preferably shrunk on to the rim in the usual manner and further secured in place by bolts 5. The band 4 is provided at intervals with notches 6 in its outer face tapering inward from one edge. A second steel band 7 of a diameter to slip readily over the band 4 is provided with wedge blocks 8 to engage the notches 6 and hold the band 7 from turning upon the band 4.

An outer curved rim 9 is provided in the usual manner with the ordinary hard rubber tire 10 and secured to the inner side of the rim 9 is a channel member 11 which is U-shaped in cross section. Secured within the U-shaped channel member at intervals around the wheel is a series of brackets 12 having inwardly extending side supporting flanges adjacent to the flanges of the channel member, forming bearings for pivot bolts 13 extending horizontally across the rim. Upon each of these bolts is a sleeve 14 free to turn upon the bolt and each sleeve is secured within an eye formed at the end of a spring 15. Each of these springs 15 is formed with a spiral at each end with a single convolution extending from the inner side of the eye formed in the end of the spring and secured to the sleeve. Intermediate its ends each spring is secured to the band 7 by means of bolts 16 and 17 there being interposed between the inner face of the spring and the outer face of the band, two wedges 18 and 19 provided with teeth on their adjacent faces adapted to interlock and hold the wedges against longitudinal movement by locking the same together. These wedges are curved to correspond to the curve of the spring and the band and are also formed with slots 20 through which the bolts 16 and 17 extend. These wedges may be adjusted upon each other to take up the slack on the bolts and by loosening the nuts on the bolts the wedges may be adjusted to put a tension upon the springs. The wedges also form a seat for each spring to support the same upon the band 7 intermediate the ends of the spring.

The band 7, the outer rim and members carried thereby, and the connecting springs 15, together form an outer resilient rim portion for the wheel which may be slipped laterally from the inner wheel portion and another rim portion put in its place should any of the parts become broken or worn. This outer resilient rim portion is held in place upon the inner rim 1 by means of U-shaped clips 21, any desired number of which may be used to embrace the springs 15 and extend inward at the sides of the rim 1 over the wedges 18 and 19 and the wedge blocks 8. These clip plates 21 are each provided with a slot 22 extending inward from one edge to receive the nut or head on the bolt 16, the clip plate thus serving as a lock to hold the nut from turning and the bolt 17 extends through a hole in the clip plate and is provided with a nut on its outer end engaging the plate to assist in holding the plate in place. This bolt 17 extends through the spring 15 the slot in the adjacent wedge 18, and the band 7 with its head engaging a countersunk opening in the wedge 8 to secure the wedge and spring to the band 7. The clip plates are also held in place by bolts 23 passing horizontally through the rim 1 and through slots 24 in the inwardly projecting ends of the plate.

The outer resilient rim portion of the wheel comprising the band 7, outer rim and connecting springs, may be quickly removed by taking out the bolts 23, removing the nuts from the bolts 17 and then slipping the clip plates outwardly from over the springs and rim 1, when the band 7 may be slipped laterally from the band 4. The bolts 16, the outer ends of which are locked against turning by the clip plates 21 when in place, hold the springs to the band 7 when the same is removed from the inner wheel portion.

The form of the springs 15 gives great resiliency and strength at the same time forming the sole connection between the inner and outer portions of the wheel. By providing these springs with a spiral at each end, the action of the spring is the same in both directions of travel of the wheel and as these coiled ends which are thinner than the intermediate portion of the springs, lie between the side flanges of the brackets 12, the springs are firmly supported against lateral strains put upon the wheel.

Each bolt 13 is formed with a longitudinal oil duct 25 extending from intermediate the ends of the bolt to near one end thereof and communicating at its outer end through a lateral opening in the bolt with an oil chamber 26 formed integral with or supported by one of the side flanges of each of the brackets 12. The inner end of the oil duct opens laterally through the side of the bolt to discharge oil into the sleeve 14 and thus keep the pivoted ends of the springs thoroughly lubricated. The oil chamber 26 extends the length of each bracket to supply oil to the two bolts carried thereby. The wedges 18 and 19 may be used to center the inner wheel within the rim as by loosening the bolts 23 and 16 and 17 any of the wedges may be driven in to equalize the tension of the springs all around the wheel.

Having thus fully described my invention what I claim is:—

1. In a vehicle wheel, the combination of an inner wheel portion, a metal band upon the inner wheel portion, an outer resilient rim portion having an inner band of a diameter to fit over the band of the inner wheel portion, tapering wedges between said bands and a series of U-shaped clips embracing the bands and covering the ends of the wedges to hold the same in place and detachably hold the outer resilient rim portion upon the inner wheel portion.

2. In a vehicle wheel, the combination of an inner wheel rim, a metal band upon the inner rim having tapering notches in its outer face, an outer resilient rim portion having an inner band to fit over the band on the inner rim, tapered wedges interposed between the bands in engagement with the notches in the band on the inner rim, members embracing said bands and covering the ends of said wedges, and means for detachably securing said members to the inner wheel rim.

3. In a vehicle wheel, the combination of an inner wheel rim, a band fitting said rim, an outer tire carrying rim, a series of springs forming the sole connection between said band and outer rim and secured intermediate their ends to said band, and means between each spring and band forming a seat for each spring adjustable to vary the length of said seat.

4. In a vehicle rim the combination of an inner wheel rim, a band loosely fitting said rim, an outer tire carrying rim, a series of springs forming the sole connection between said band and rim, wedge members between said band and spring forming adjustable seats for said springs, and a series of clips embracing said members, springs, band, and inner rim to detachably secure the band and springs to the inner rim.

5. In a vehicle wheel, the combination with an inner rim, a band to loosely fit the inner rim, means for detachably securing the band on the inner rim, an outer tire carrying rim, a series of springs forming the sole connection between said band and outer rim, each secured intermediate its ends to the band, and interlocking adjustable wedges interposed between each spring and band and forming a seat for the spring adjustable in length by a longitudinal movement of the wedges.

6. In a vehicle wheel, the combination with an inner wheel portion and an outer wheel portion, of a series of springs curved longitudinally throughout their length and secured intermediate their ends to one of the wheel portions, and wedges between each spring and the wheel portion to which it is secured and movable longitudinally of said spring to form a seat adjustable in length to increase or decrease the resiliency of said springs.

7. In a vehicle wheel, the combination with an inner wheel portion and an outer wheel portion, of a series of springs, bolts forming pivots for said springs and each having a longitudinal oil duct for conducting oil to the bearing surface of the spring upon the bolt, and an oil chamber carried by the bearing for the end of the bolt and communicating with the oil duct.

8. In a vehicle wheel, the combination of an inner wheel portion, an outer wheel portion, a series of springs, brackets on one of the wheel portions having flanges extending at each side of the springs and forming bearings, pivot bolts to which the springs are pivotally attached mounted in the bearings on said brackets, and each formed with an oil duct, and an oil chamber on one of the flanges of each bracket with which said oil ducts communicate.

9. In a vehicle wheel, the combination of an inner wheel rim, a band secured to the inner wheel rim, an outer band fitting upon the band of the wheel rim, wedges between said bands extending transversely thereof, an outer tire carrying rim, a channel member secured to the inner side of the tire rim, a series of springs attached intermediate their ends to the outer band and each formed with volute ends pivotally supported within the channel member and forming the sole connection between said band and tire rim, overlapping wedges having interlocking teeth interposed between said band and springs longitudinally thereof and a series of clips embracing the springs intermediate their ends and the bands, and detachably secured to the inner rim over said longitudinal and transverse wedges.

In testimony whereof I affix my signature in presence of two witnesses.

EMIL F. KRELL.

Witnesses:
 LEWIS E. FLANDERS,
 ANNA RAVILER.